United States Patent [19]
Knödler

[11] Patent Number: 4,770,956
[45] Date of Patent: Sep. 13, 1988

[54] ELECTROCHEMICAL STORAGE CELL

[75] Inventor: Reinhard Knödler, Sandhausen, Fed. Rep. of Germany

[73] Assignee: Brown Boveri & Cie AG, Mannheim, Fed. Rep. of Germany

[21] Appl. No.: 46,024

[22] Filed: May 1, 1987

[30] Foreign Application Priority Data

May 6, 1986 [DE] Fed. Rep. of Germany ....... 3615240

[51] Int. Cl.$^4$ ............................................. H01M 6/20
[52] U.S. Cl. ..................................... 429/104; 429/176
[58] Field of Search ................................ 429/104, 176

[56] References Cited

U.S. PATENT DOCUMENTS

| | | | |
|---|---|---|---|
| 4,216,275 | 8/1980 | Hartmann et al. | 429/104 |
| 4,414,296 | 11/1983 | Mennicke et al. | 429/104 X |
| 4,638,555 | 1/1987 | MacLachlan et al. | 429/104 X |

FOREIGN PATENT DOCUMENTS

| | | |
|---|---|---|
| 2751947 | 5/1978 | Fed. Rep. of Germany . |
| 2720726 | 11/1978 | Fed. Rep. of Germany . |
| 2822284 | 12/1978 | Fed. Rep. of Germany . |
| 2911018 | 9/1979 | Fed. Rep. of Germany . |
| 2857354 | 1/1980 | Fed. Rep. of Germany . |
| 3117381 | 11/1982 | Fed. Rep. of Germany . |
| 3225873 | 4/1985 | Fed. Rep. of Germany . |
| 3334669 | 11/1985 | Fed. Rep. of Germany . |

OTHER PUBLICATIONS

Japanese Patents Abstracts, E-291, Jan. 22, 1985, vol. 9, No. 15, 59-165378.

Primary Examiner—Anthony Skapars
Attorney, Agent, or Firm—Herbert L. Lerner; Laurence A. Greenberg

[57] ABSTRACT

An electrochemical storage cell based on sodium and sulfur having an anode space and a cathode space, which are separated from one another by an alkali-ion-conducting solid electrolyte and defined at least partially by a metal housing. The metal housing is provided at least on its inner surface with an anti-corrosion film that as its essential components contains iron and chromium and at least one of (a) nickel and (b) cobalt. The anti-corrosion film is formed by an alloy the nickel or cobalt equivalent of which is less than its chromium equivalent.

1 Claim, 1 Drawing Sheet

U.S. Patent  Sep. 13, 1988  4,770,956
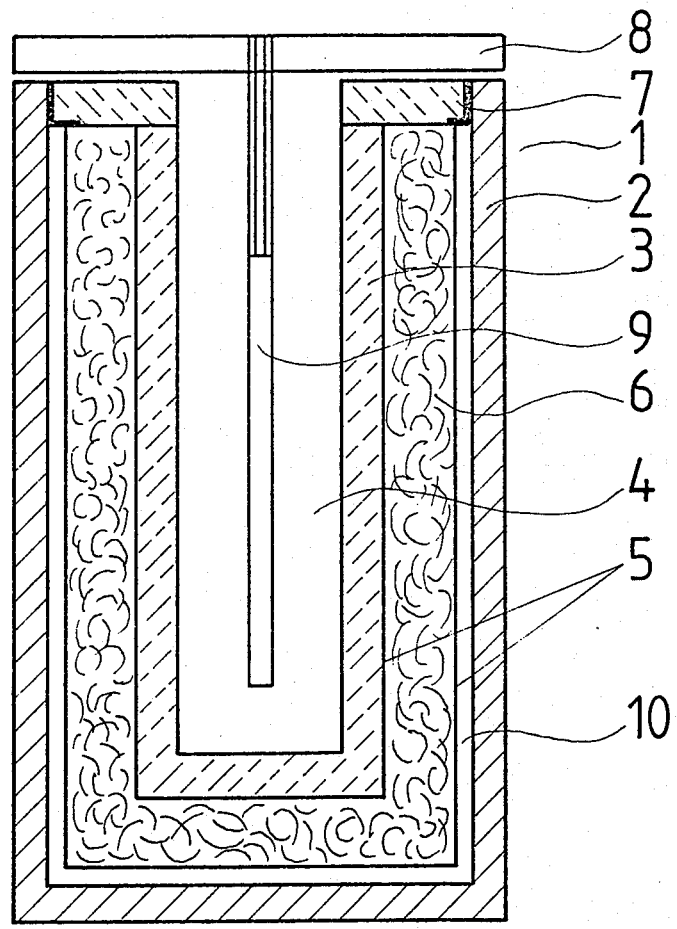

ELECTROCHEMICAL STORAGE CELL

BACKGROUND OF THE INVENTION

1. Field of the Invention

The invention relates to an electrochemical storage cell based on sodium and sulfur having an anode space and a cathode space, which are separated from one another by an alkali-ion-conducting solid electrolyte and defined at least partially by a metal housing.

2. Description of the Prior Art

Such electrochemical storage cells are suitable as energy sources. They are increasingly used in designing storage batteries that are intended for supplying current to electric vehicles.

One special example of these storage cells is the cells based on sodium and sulfur, which are rechargeable and have a solid electrolyte of beta-aluminum oxide, which separates the anode space from the cathode space. One pronounced advantage of these storage cells is that when they are charged, secondary electro-chemical reactions do not take place, and so the current yield is approximately 100%. In such storage cells, the anode space is filled with sodium and disposed inside the solid electrolyte. The cathode space is located between the solid electrolyte and the metal housing, which defines the storage cell with respect to the outside. Aluminum is preferably used for producing the housing. The reactants contained in the storage cell, or the reaction products that form, are highly corrosive substances. Accordingly the housing walls that come into contact with the reactants are exposed to corrosive influences. To overcome these disadvantages, it has already been proposed in the journal "Thin Solid Films" 83 (1981), page 417, that the inner surfaces of the metal housing of these storage cells be coated with an anti-corrosion film. To form this anti-corrosion film, alloys containing chromium, nickel, cobalt and molybdenum were proposed.

German Published, Non-Prosecuted Application DE-OS No. 24 57 418, discloses applying a protective film of graphite to the inner surfaces of an electrochemical storage cell.

U.S. Pat. No. 3,749,603 describes a metal housing of light metal, the inner surfaces of which are protected from corrosion with a coating of molybdenum sulfide.

The above possibilities are capable of improving the corrosion resistance of the housing for a short time, but they have the disadvantage that the internal resistance of the storage cells, with increasing age, increases very sharply because of the formation of sulfide-containing films, or other kinds of non-conductive films, on the inner wall of the housing.

SUMMARY OF THE INVENTION

It is accordingly an object of the invention to provide an electrochemical storage cell having a housing of light metal that is resistant to the reactants and reaction products that form.

With the foregoing and other objects in view, there is provided in accordance with the invention an electrochemical storage cell based on sodium and sulfur having an anode space and a cathode space, which are separated from one another by an alkali-ion-conducting solid electrolyte and defined at least partially by a metal housing, the improvement comprising, providing the metal housing at least on its inner surface with an anti-corrosion film that as its essential components contains iron and chromium and at least one of (a) nickel and (b) cobalt, and further that the anti-corrosion film is formed by an alloy the nickel or cobalt equivalent of which is less than its chromium equivalent.

As nickel equivalent a component of an alloy is defined which contains nickel and/or one or more chemical elements which show the same effect and the same reations as nickel in said alloy. An equivalent definition exists for a chromium equivalent.

Other features which are considered as characteristic for the invention are set forth in the appended claims.

Although the invention is illustrated and described herein as embodied in electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing diagrammatically illustrates an electrochemical storage cell having an aluminum housing with a cup-shaped solid electrolyte in its interior, which latter serves as the anode space. The intermediate space between the electrolyte and the housing is the cathode space in which an electrode made of filamentary material of carbon or graphite and saturated with sulfur is disposed. The inner surfaces of the housing are coated with an anti-corrosion film formed of an alloy that contains iron, chromium and at least one of (a) nickel and (b) cobalt as essential elements. The composition is selected such that the proportion of the nickel or cobalt equivalent in the alloy is smaller than the proportion of the chromium equivalent, such anti-corrosion film has a high coefficient of expansion, on the order of $16 \times 10^{-6}$ grd$^{-1}$.

DESCRIPTION OF THE PREFERRED EMBODIMENTS

The invention will be described in further detail below, referring to the drawing.

The storage cell 1 shown in the drawing is closed off from the outside by a metal housing 2, which in the exemplary embodiment shown here is cup-shaped. It is made of a light metal, preferably aluminum. In the interior of the metal housing 2, an also cup-shaped solid electrolyte 3 is provided. It is made of beta-aluminum oxide, which has a breaking strength of greater than or equal to 100 MPa. Its interior serves as the anode space 4. The anode space, in the exemplary embodiment shown here, is filled with sodium. The dimensions of the solid electrolyte 3 are selected such that between its outer surfaces and the inner surfaces of the metal housing, a cohering intermediate space remains, which serves as the cathode space. The cathode space 5 includes the electrode 6, which is made from a felt-like or filamentary material based on graphite or carbon. Additionally, the electrode is saturated with sulfur. The dimensions of the electrode 6 are selected such that the entire cathode space is filled with it. In accordance with the invention, the inner surfaces of the housing 2 are coated with an anti-corrosion film 10. This anti-corrosion film comprises an alloy that contains iron, chromium and at least one of (a) nickel and (b) cobalt, as essential components. Molybdenum may be included as a component of the alloy. As a nickel equivalent, the alloy contains not only nickel but also carbon and/or manganese. As a chromium equivalent, not only chromium but also silicon, molybdenum, vanadium, aluminum, niobium, titanium and/or tungsten are contained in the alloy. The term "nickel equivalent" is intended to mean percent by weight of nickel, carbon and manganese based on the total weight of the alloy. The term "cobalt equivalent" is intended to percent by weight of cobalt, carbon and manganese based on the total weight of the alloy. The term "chromium equivalent" is intended to mean percent by weight chromium, silicon, molybdenum, vanadium, aluminum, niobium, titanium and tungsten. The most important ingredient, however, is chromium, with a content of between 23 and 26% being provided. The composition of the alloy is in particular selected such that the proportion of the nickel equivalent in the alloy is 10% smaller than the proportion of the chromium equivalent. A preferred composition of the alloy used for the anti-corrosion film 10 has from 13–15% nickel or cobalt, 0.1% carbon and 1% manganese as well as from 23–26% chromium and 1% silicon, the remaining portion of the alloy comprising iron. For forming the anti-corrosion film, the inner surface of the housing 2 that is to be protected is cleaned prior to the application of the alloy. Then, the alloy material, in powder form, is applied to the inner surfaces of the housing 2 with the aid of a known plasma spraying method or flame spraying method. An anti-corrosion film of an alloy such as that described above has an austenitic structure and thus has a high coefficient of expansion, on the order of $16 \times 10^{-6} \text{grd}^{-1}$. This assures that the mechanical strains that arise between the aluminum of the housing 2 and the anti-corrosion film 10 applied to it when the storage cell 1 heats up and cools down will be only very slight. The formation of fissures in the anti-corrosion film is thus precluded. The reactants and reaction products are prevented from reaching the housing itself of the storage cell, so that the storage cell is durably protected. Since no fissures form in the anti-corrosion film, there is also no danger that this film will rapidly become detached from the housing wall; instead, the anti-corrosion film has a life as long as that of the storage cell itself.

Once that anti-corrosion film 10 according to the invention has been provided on the inner surface of the metal housing 2, the storage cell 1 is assembled, in that the cathode space 5 is first filled with the electrode 6, which contains the sulfur, and then the solid electrolyte 3 is inserted into the metal housing 2. The interior of the solid electrolyte 3 contains the sodium. At the upper open end of the solid electrolyte 3, an insulating ring 7 is provided, which is made of alpha-aluminum oxide. It is joined to the solid electrolyte 3 via a glass solder (not shown here) and protrudes beyond it to the outside, thereby forming a flange. The dimensions of the ring 7 are selected such that it borders on the inner surfaces of the metal housing 2 and thus closes off the cathode space 5, formed between the solid electrolyte 3 and the metal housing 2, from the outside. The closure of the entire interior of the storage cell 1 is effected via a cap 8, which is durably joined to the metal housing 2. The cap 8 is made of an electrically conductive material. On its downward-pointing side, a bar 9 is secured, which is likewise made of an electrically conductive material and which serves as an anode current collector. The metal housing 2 serves as the cathode current collector.

The foregoing is a description corresponding, in substance, to German application No. P 36 15 240.4, dated May 6, 1986, international priority of which is being claimed for the instant application and which is hereby made part of this application. Any material discrepancies between the foregoing specification and the specification of the aforementioned corresponding German application are to be resolved in favor of the latter.

I claim:

1. An electrochemical storage cell based on sodium and sulfur having an anode space and a cathode space, which are separated from one another by an alkali-ion-conducting solid electrolyte and defined at least partially by a metal housing, the improvement comprising, providing the metal housing at least on its inner surface with an anti-corrosion film that as its essential components contains iron and chromium and at least one of (a) nickel and (b) cobalt, and further that the anti-corrosion film is formed by an alloy having at least one of a nickel and a cobalt equivalent which is less by approximately 10% than a chromium equivalent thereof, the alloy containing from 13–15 weight % of at least one of the nickel and the cobalt, 0.1 weight % of carbon and 1 weight % of manganese as well as from 23–26 weight % of the chromium and 1 weight % of silicon, based on the total weight of the alloy, the remainder being the iron.

* * * * *